US012682130B2

(12) United States Patent
Tonelli et al.

(10) Patent No.: US 12,682,130 B2
(45) Date of Patent: Jul. 14, 2026

(54) OPTIMIZATION OF A QUADRATIC ASSIGNMENT PROBLEM ON A LATTICE

(71) Applicant: Raytheon Company, Arlington, VA (US)

(72) Inventors: Cecilia Tonelli, Rome (IT); Tuhin Sahai, San Francisco, CA (US)

(73) Assignee: Raytheon Company, Arlington, VA (US)

( * ) Notice: Subject to any disclaimer, the term of this patent is extended or adjusted under 35 U.S.C. 154(b) by 822 days.

(21) Appl. No.: 17/987,399

(22) Filed: Nov. 15, 2022

(65) Prior Publication Data

US 2023/0153481 A1    May 18, 2023

Related U.S. Application Data

(60) Provisional application No. 63/279,913, filed on Nov. 16, 2021.

(51) Int. Cl.
*G06F 30/13* (2020.01)
*G06Q 10/04* (2023.01)

(52) U.S. Cl.
CPC ........... *G06F 30/13* (2020.01); *G06Q 10/043* (2013.01); *G06F 2101/08* (2013.01)

(58) Field of Classification Search
CPC .. G06F 30/13; G06F 2101/08; G06F 16/9024; G06Q 10/043
See application file for complete search history.

(56) References Cited

U.S. PATENT DOCUMENTS

2022/0351133 A1* 11/2022 Akiona ................ G06Q 10/087

FOREIGN PATENT DOCUMENTS

WO        2023091396        5/2023

OTHER PUBLICATIONS

Georgiadis, Michael C., et al. "A general mathematical programming approach for process plant layout." Computers & chemical engineering 23.7 (1999): 823-840. (Year: 1999).*
Mishra, Prateer. A multi-attribute layout design problem. Diss. Virginia Polytechnic Institute and State University, 1992. (Year: 1992).*
"International Application Serial No. PCT US2022 049929, International Search Report mailed Mar. 17, 2023", 4 pgs.

(Continued)

*Primary Examiner* — Chuen-Meei Gan
(74) *Attorney, Agent, or Firm* — Schwegman Lundberg & Woessner, P.A.

(57) ABSTRACT

A process for computing the optimal solution to the quadratic assignment problem (QAP) defined on lattices includes storing facility data as facilities in a facility grid with facility tiles. Location data are stored as locations in a location grid with location tiles. Each facility tile is associated with a location tile and each facility in each facility tile is associated with a location in an associated location tile. A flow function is identified as distances between the plurality of facilities in the facility grid, and a distance function is identified as distances between the plurality of locations in the location grid. An association function relating the facilities to the locations is identified such that a solution with a low-cost function depending on the flow function and the distance function is found.

15 Claims, 10 Drawing Sheets

(56)             References Cited

OTHER PUBLICATIONS

"International Application Serial No. PCT US2022 049929, Written Opinion mailed Mar. 17, 2023", 7 pgs.

"Facility Layout Add-in", [Online] Retrieved from the internet:https: www.yumpu.com en document view 40315037 facility-layout-add-in, (Jan. 1, 2004), 41 pgs.

Balakrishnan, Jaydeep, "FACOPT: a user friendly FACility layout OPTimization system", Computers and Operations Research, vol. 30, No. 11,, [Online] Retrieved from the internet:https: prism.ucalgary.ca bitstream handle 1880 46665 Balakrishnan_C0~2003.pdf;jsessionid=1F22968C03933500COB50DBOCCAEC8C9?sequence=1, (Sep. 1, 2003), 29 pgs.

Singh, S P, "A review of different approaches to the facility layout problems", The International Journal of Advanced Manufacturing Technology, Springer, Berlin, DE, vol. 30, No. 5-6, (Nov. 12, 2005), 9 pgs.

Burkard, Rainer, et al., "The Quadratic Assignment Problem", (1998), 71 pgs.

Steinberg, Leon, "The Backboard Wiring Problem: A Placement Algorithm", SIAM Review, vol. 3, No. 1, (1961), 37-50.

* cited by examiner

| P09 ● | P18 ● | P27 ● | P36 ● |
| P08 ● | P17 ● | P26 ● | P35 ● |
| P07 ● | P16 ● | P25 ● | P34 ● |
| P06 ● | P15 ● | P24 ● | P33 ● |
| P05 ● | P14 ● | P23 ● | P32 ● |
| P04 ● | P13 ● | P22 ● | P31 ● |
| P03 ● | P12 ● | P21 ● | P30 ● |
| P02 ● | P11 ● | P20 ● | P29 ● |
| P01 ● | P10 ● | P19 ● | P28 ● |

*Fig.2*

LOCATION GRID, k=2, num LOCATIONS = 36

FACILITY GRID, k=2, num FACILITIES = 36

LOCATION TILE LT1, CONTAINS LOCATIONS L1, L6, L31, L36...

... AND IS ASSOCIATED TO
FACILITY TILE FT9, CONTAINING FACILITIES F15, F16, F21, F22

LOCATION TILE LT2, CONTAINS LOCATIONS L7, L12, L25, L30...

... AND IS ASSOCIATED TO
FACILITY TILE FT8, CONTAINS FACILITIES F9, F10, F27, F28

OPTIMIZATION OF A QUADRATIC ASSIGNMENT PROBLEM ON A LATTICE

CLAIM OF PRIORITY

This patent application claims the benefit of U.S. Provisional Patent Application No. 63/279,913, filed Nov. 16, 2021, entitled "OPTIMIZATION OF A QUADRATIC ASSIGNMENT PROBLEM ON A LATTICE", which is incorporated by reference herein in its entirety.

TECHNICAL FIELD

The present disclosure relates to the optimization of the quadratic assignment problem (QAP) on lattices, and in an embodiment, but not by way of limitation, given a set of facilities, a set of locations, a flow function, and a distance function, the associated cost function and corresponding solution to the minimization are automatically determined.

BACKGROUND

The quadratic assignment problem (QAP) was introduced by Koopmans and Beckman in 1957. The QAP objective is to assign a set of n facilities to a set of n locations to minimize the total assignment cost, which is a quadratic function of the flow between the facilities and the distance between the locations. It is a strongly NP-hard problem; thus, one is forced to resort to heuristics. Typical strategies for solving QAP instances involve heuristics to find feasible solutions which are subsequently improved over multiple iterations. But finding exact solutions for QAP instances is infeasible, even for small n (number of facilities and locations). The QAP can be interpreted as the problem of locating n facilities to n locations so as to minimize the assignment cost function that depends on the distances between locations and the flow between facilities.

More specifically, in any given instance of the QAP, one is given two sets, P ("facilities") and L ("locations"), of equal size n, together with a flow function f: P×P→R and a distance function d: L×L→R. One would like to find the bijection π: P→L ("assignment"/"permutation") that minimizes the following cost function:

$$\sum_{a,b \in P} f(a, b) * d(\pi(a), \pi(b))$$

FIG. 1 illustrates a generic QAP problem. That is, where to place a certain number of facilities in an equal number of locations so as to minimize the quadratic assignment cost of flows and distances amongst the facilities and locations. More specifically, FIG. 1 illustrates four facilities in four locations, and the consideration of the distance between the locations and the flow between the facilities.

Steinberg (1961) introduced the "backboard wiring" problem that required the placement of n elements in a computer backboard such that two elements must be connected with a known number of wires. In the original paper the author states that the positions the elements shall occupy in the backboard can be interpreted as a set of lattice points. This problem is also known as wire-routing problem.

FIG. 2 illustrates an original formulation of a backboard wiring problem. This wiring problem illustrated in FIG. 2 can be interpreted as a QAP problem with thirty-six locations (sites in the backboard) and facilities (elements to position in the backboard), where the distance function is the actual distance between backboard sites and the flow function is the number of wires every two backboard elements share.

A feature of the QAP is its hardness, that is, an increase in hardness results in a disproportionately greater requirement in computation resources to compute the solution. The QAP is not only NP-complete, but also the search for an E-approximate solution is NP-complete, making it considered "among the hardest of the hard of all combinatorial optimization problems," as it often described in literature. A decision problem is NP-complete if it is in NP, and every problem in NP is reducible to it in polynomial time.

BRIEF DESCRIPTION OF THE DRAWINGS

FIG. 2 illustrates an original formulation of a backboard wiring problem.

DETAILED DESCRIPTION

In the following description, for purposes of explanation, numerous specific details are set forth in order to provide a thorough understanding of the various aspects of different embodiments of the present invention. It will be evident, however, to one skilled in the art that the present invention may be practiced without all the specific details and/or with variations, permutations, and combinations of the various features and elements described herein.

An embodiment of the present disclosure provides a description of an innovative methodology for solving QAP instances defined on finite lattices (grids). It is assumed that locations are points on a k dimensional finite grid, and the distance function is the norm function defined on the set of these grid points. Facilities are points on a different k dimensional finite grid, and the flow function is the norm function defined on the set of these (other) grid points. A new heuristic for solving the QAP that arises in the Steinberg wiring problem is disclosed herein. An advantage of our proposed approach is that it does not involve iterations as required by state-of-the-art methods such as simulated annealing.

Figure 1:
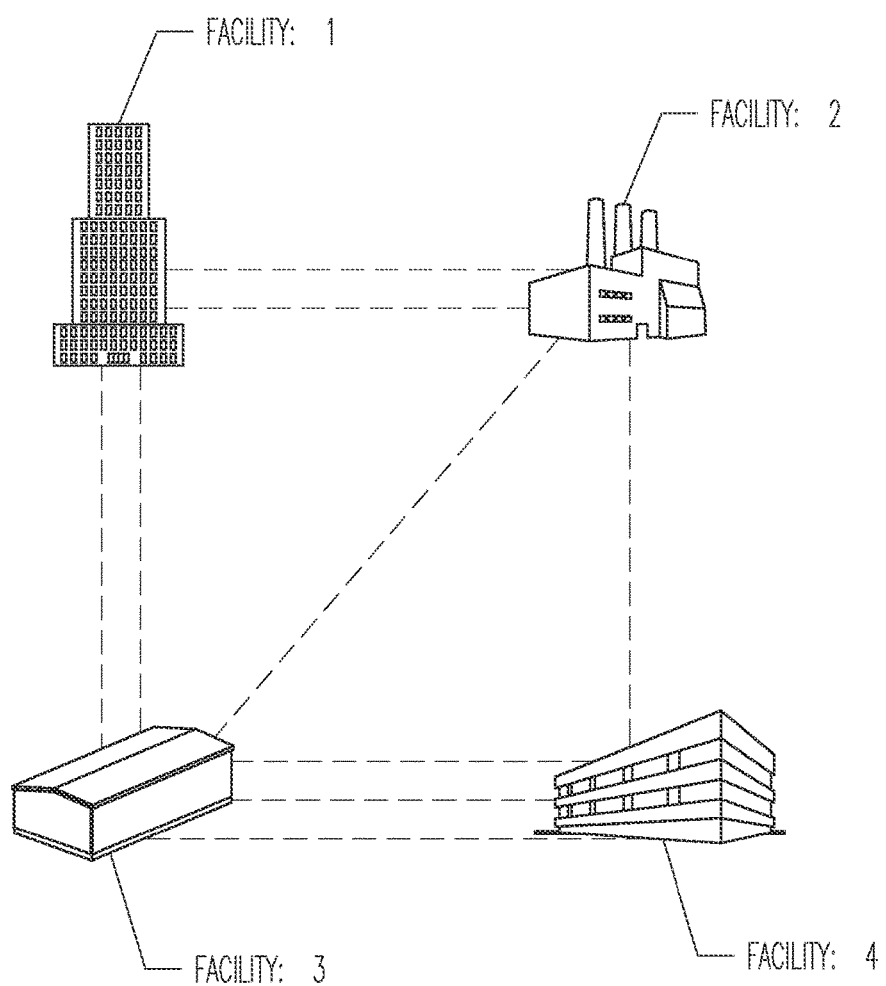
FIG. 1 illustrates a generic QAP problem.
Figure 3:
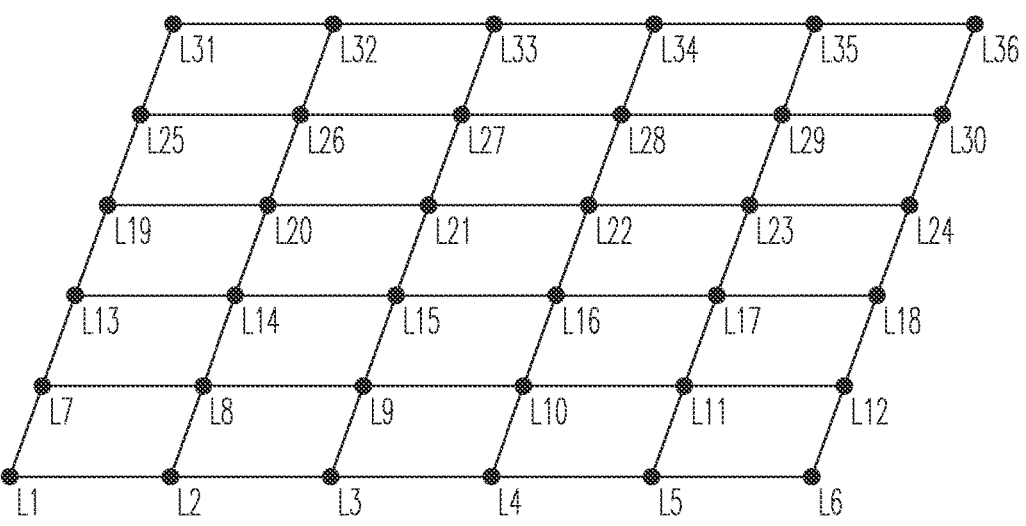
FIG. 3 illustrates an example of location and facility grids.
Figure 3:
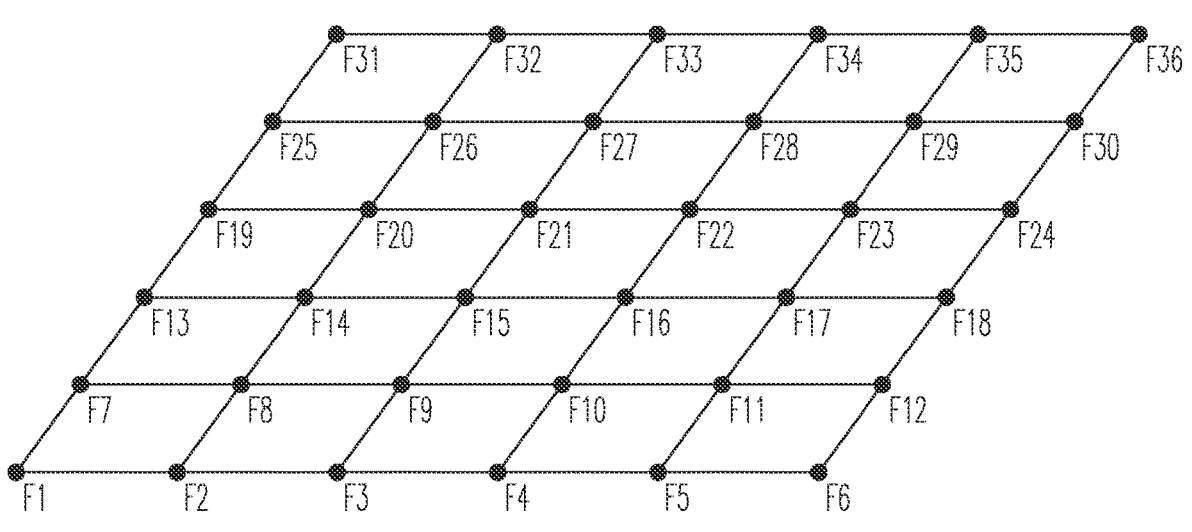

In either the generic lattice QAP problem or the more specific backboard wiring problem, the proposed strategy for a solution consists of three steps. At first, dividing the two grids of points (locations and facilities) into tiles. FIG. 3 shows the location grid and the facility grid on a simple example in two dimensions. In this example there are 36 locations (L1, L2, . . . , L36) and facilities (F1, F2, . . . , F36). The location grid is divided into 9 tiles, LT1, LT2, LT3, LT4, LT5, LT6, LT7, LT8 and LT9, each containing 4 locations. The 9 tiles may contain the following locations:

LT1=[L1, L6, L31, L36], LT2=[L2, L5, L32, L35], LT3=[L7, L12, L25, L30], LT4=[L8, L11, L26, L29], LT5=[L3, L4, L33, L34], LT6=[L13, L19, L18, L24], LT7=[L14, L17, L20, L23], LT8=[L9, L10, L27, L28], LT9=[L15, L16, L21, L22]. The facility grid is divided into 9 tiles, following the same strategy, thus having:

FT1=[F1, F6, F31, F36], FT2=[F2, F5, F32, F35], FT3=[F7, F12, F25, F30], FT4=[F8, F11, F26, F29], FT5=[F3, F4, F33, F34], FT6=[F13 F19, F18, F24], FT7=[F14, F17, F20, F23], FT8=[F9, F10, F27, F28], FT9=[F15, F16, F21, F22]. Second, every "location tile" is mapped to a unique "facility tile" such that the tiles with long edges in the location tile set are associated with tiles with short edges in the facility tile set. Following this example, the location and facility tiles can be mapped like this:

LT1 with FT9, LT2 with FT8, LT3 with FT7, LT4 with FT6, LT5 with FT5, LT6 with FT4, LT7 with FT3, LT8 with FT2, LT9 with FT1. Third, every point in a "location tile" (that is, a location) is associated to a point in the correspondent "facility tile" (that is, a facility). This means, for example, defining a mapping between elements of LT1 and FT9 as: L1 with F15, L6 with F16, L31 with F21 and L36 with F22, and so on for the remaining pairs of tiles. At the end, there is a mapping (association) between every facility and one and only one location. In what follows the above sequence of steps is generalized for arbitrary dimensions.

The definition of the three strategies and their implementation leads to a deterministic and non-iterative (consequently, the approach is faster than existing methods) heuristic for solving QAPs defined on lattices. This problem addresses the special case of the backboard wiring problem, as well as the generic QAP where flow and distance functions can be interpreted as distance functions on the sets of lattice points.

Figure 4:
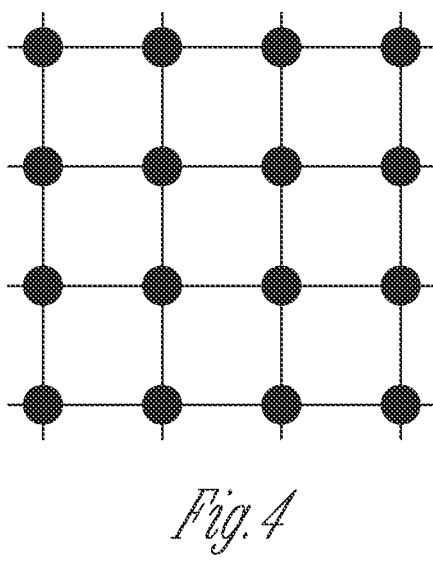
FIG. 4 illustrates a lattice in two dimensions.

Definition 1. A lattice is a discrete additive subgroup of $R^k$. Definition 2. Let $B=[b_1; \ldots; b_k]$ be linearly independent vectors in R^k. The lattice generated by B, L(B) is the set of all the integer linear combinations of the vectors of B. The matrix B is called a basis for the lattice L(B). FIG. 4 illustrates a lattice in two dimensions.

Figure 5:
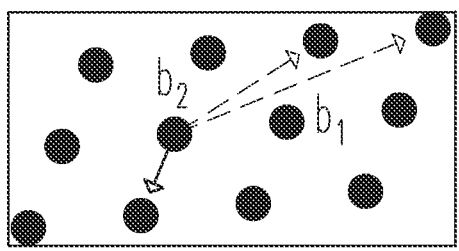
FIG. 5 illustrates the shortest vector problem.

Some well-known computational problems on lattices are the following:

Shortest Vector Problem (SVP): As illustrated in FIG. 5, given a lattice basis B (B=[b1, b2]), one must find the shortest nonzero vector in the lattice generated by B, also named L(B).

Figure 6:
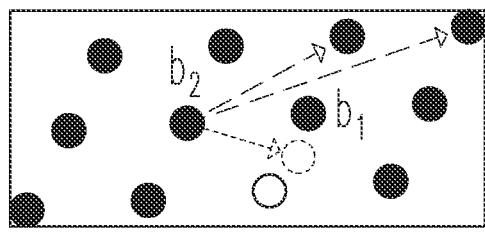
FIG. 6 illustrates the closest vector problem.

Closest Vector Problem (CVP): As illustrated in FIG. 6, given a lattice basis B and a target vector t (not necessarily in the lattice), one must find the lattice point v in L(B) closest to t.

The strategy of resolution of problems relies on finding a "good basis" for the lattice.

A "good" basis is one such that:
Its vectors are as short as possible,
Its vectors are as orthogonal as possible.

Figure 8:
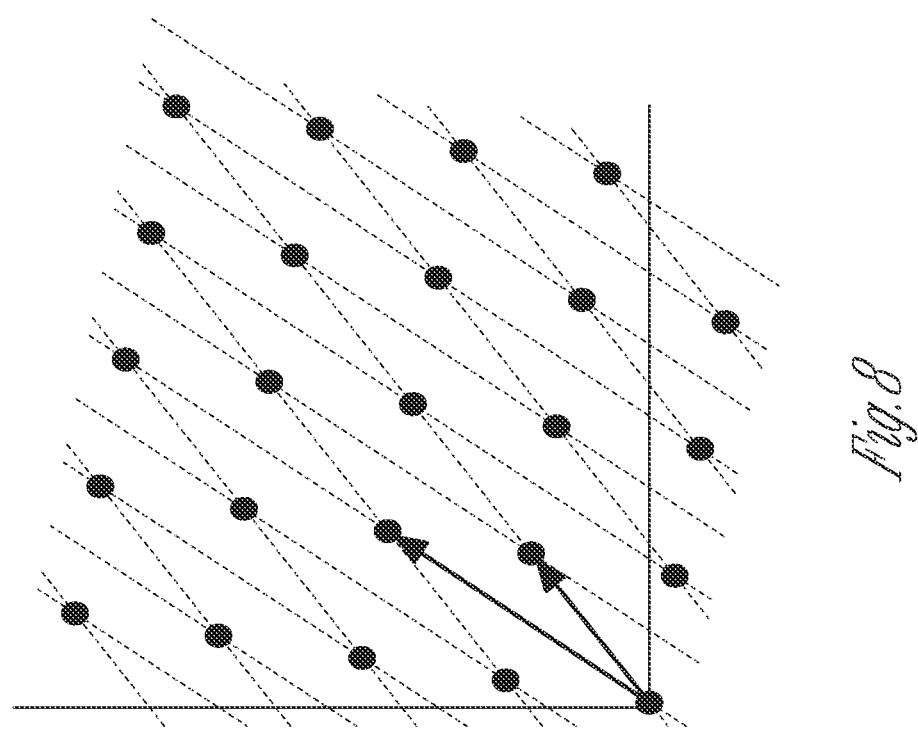
FIG. 8 illustrates the same lattice defined by a "bad" basis.
Figure 7:
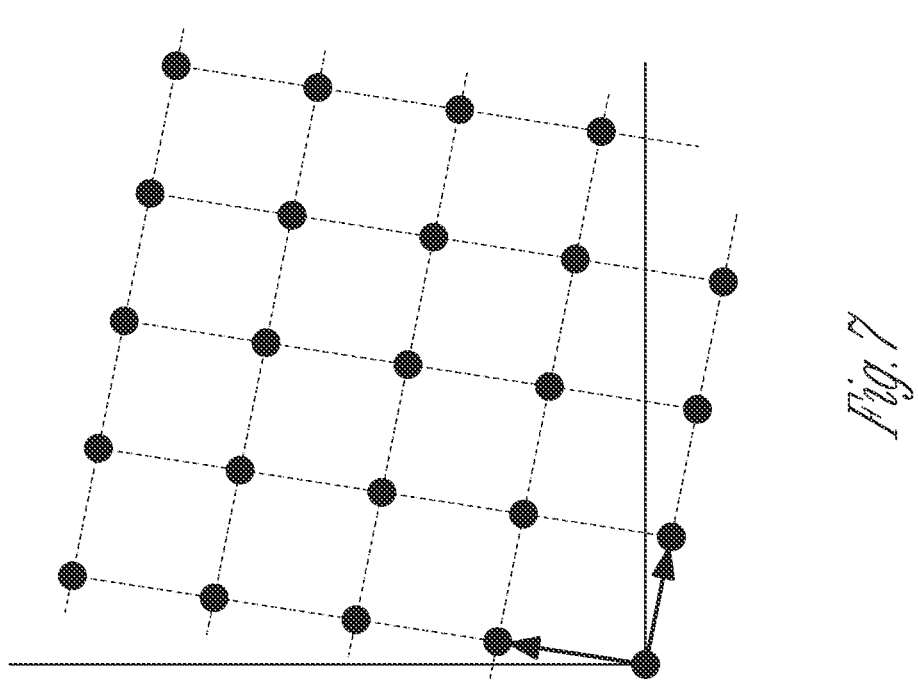
FIG. 7 illustrates a lattice defined by a "good" basis.

The same lattice can be defined by a "good" basis and by a "bad" basis, and by any basis in between (it is easy in low dimensions to go from a bad basis to good basis, but computationally very challenging in high-dimensional settings). FIG. 7 and FIG. 8 show the same lattice generated by two different bases (one "good" in FIG. 7 and the other "bad" in FIG. 8).

Algorithms for solving the SVP and CVP are either exponential in the number of operations or have an exponential approximation factor. It is noted that there is no polynomial time algorithm that approximates lattice problems to within polynomial factors.

SVP and CVP problems are believed to be resistant to quantum attacks and consequently used for data encryption. It is noted that there is no polynomial time quantum algorithm that approximates lattice problems to within polynomial factors.

Figure 9:
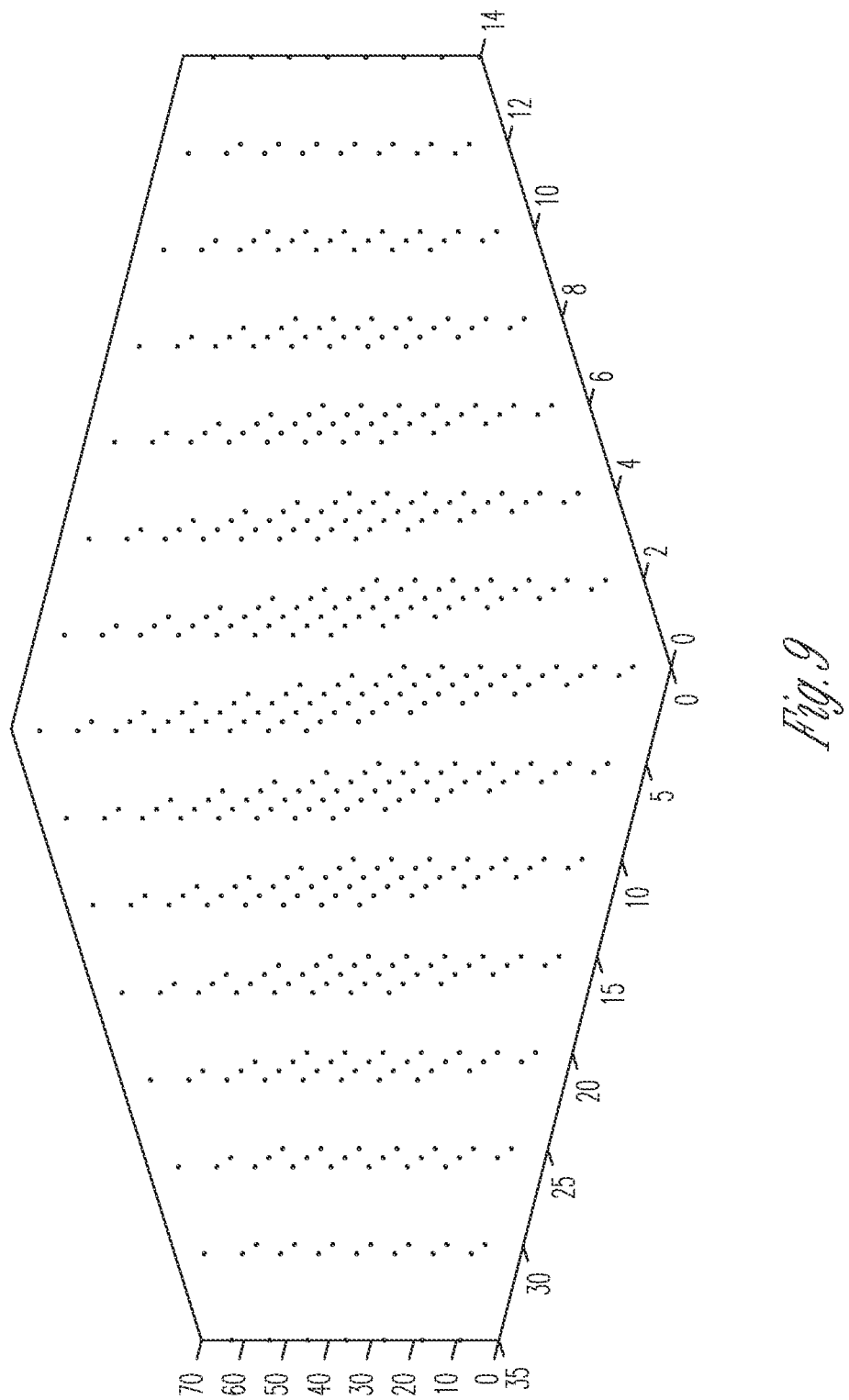
FIG. 9 illustrates a grid generated by k=3, n=$8^3$, $B_L$=(2, 0,0) (0,5,0) (0,0,9).
Figure 10:
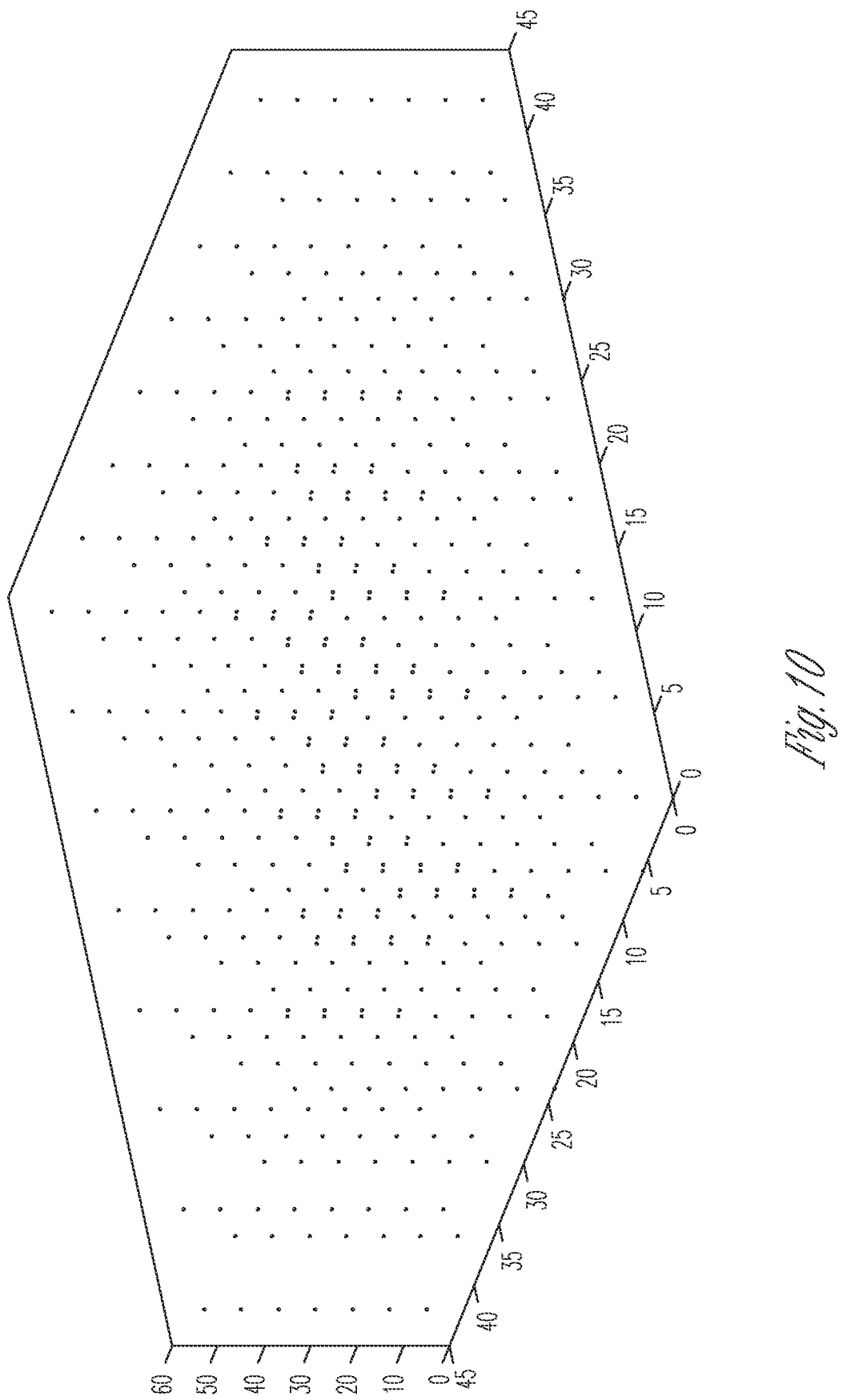
FIG. 10 illustrates a grid generated by k=3, n=$8^3$, $B_F$=(6, 0,0) (0,6,0) (0,0,8).

For QAP on lattices, consideration is given to special instances of QAP problems. Specifically, it is assumed that locations are points in a k-dimensional finite grid, and the distance function is the norm function between any pair of grid points. Similarly, facilities are points in a different k-dimensional finite grid, and flow function is the norm function between any pair of grid points. Referring to FIG. 9, k=3, $n=8^3$, generated by basis $B_L=(2,0,0)$ (0,5,0) (0,0,9). The distance between grid points is the distance function. Referring to FIG. 10, k=3, $n=8^3$, generated by basis $B_F=(6,0,0)$ (0,6,0) (0,0,8). The distance between grid points is the flow function. QAP is fully defined by (n, $B_F$, $B_L$).

Now, with the above as background, a novel approach for solving QAP lattices is disclosed. This novel approach can be used for wire-routing optimization, factory layout optimization, and other applications. The novel approach is deterministic and non-iterative.

As a first step, the two grids are partitioned into tiles of the same cardinality. Let L and P be the set of all locations and facilities, respectively. Let n be their cardinality (L and P have same cardinality by definition of the QAP problem). To partition the two grids into tiles, three things have to be decided: the cardinality of the tiles, a strategy to partition the location grid, and a strategy to partition the facility grid. For the first point, the grids are divided into tiles of cardinality $2^k$, as the vertices of a k-dimensional cube (in this case the number of tiles is $n/2^k$), but any cardinality divisor of the number of locations/facilities is also possible. Secondly (and thirdly), the same strategy is used to partition the two grids (in another embodiment, the strategies could differ). The volume of a tile is the volume of the polytope whose vertices consist of the grid points contained in the tile, i.e. if a tile is made of h grid points, T=[A1, A2, ... $A_h$], then its volume is Vol(T)=Volume(A1, A2, ... $A_h$). Although the strategy to partition the grids can be arbitrary, the knowledge of the ("good") basis of the lattices associated to the grids to define tiles that vary from the one having biggest volume (the tile containing the $2^k$ vertices of the grid) to the smallest volume is leveraged. As depicted in connection with the example discussed above and in FIG. 13, tile LT1 contains the 4 locations with maximum distance (norm), while tile LT9 contains 4 locations with the shortest (non-unique) distance (norm). Tiles LT1, LT2, ..., LT9 are ordered in decreasing order with respect to their volume, i.e. Vol(LT1)>Vol(LT2)> ... >Vol(LT9). The same logic holds for facilities tiles. The sets of locations and facilities can therefore be addressed as follows:

$$L = \bigcup_{i=1, \ldots, n/2^k} LTi$$

$$P = \bigcup_{i=1, \ldots, n/2^k} FTi$$

US 12,682,130 B2

5

Figure 11:
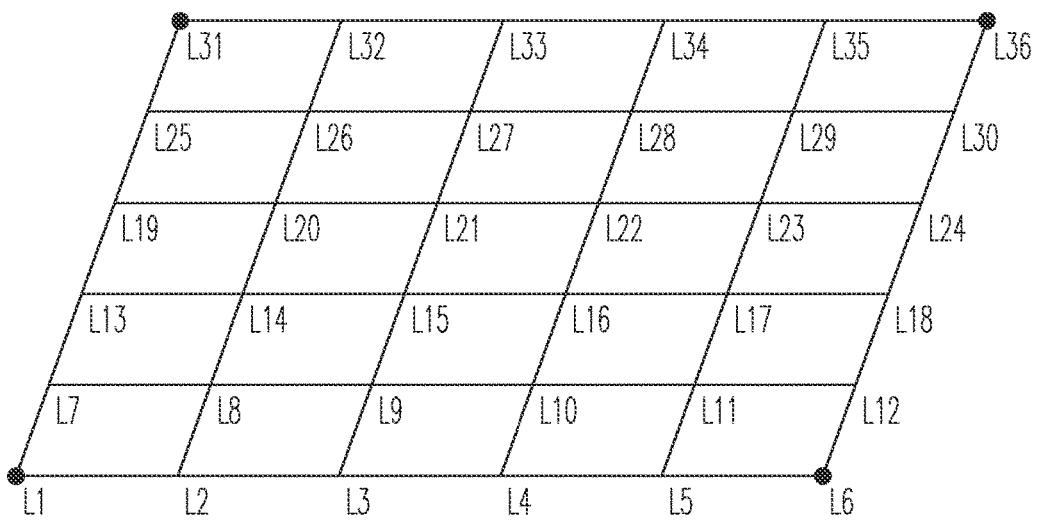
FIGS. 11, 12, 13 and 13A illustrate an example of associating a location tile with a facility tile.
Figure 12:
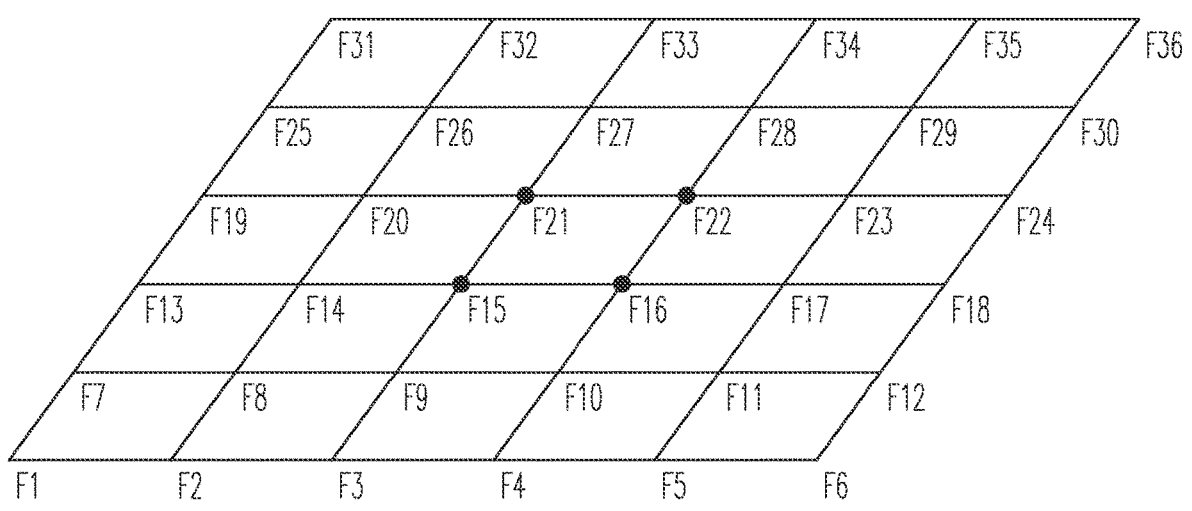
Figure 13:
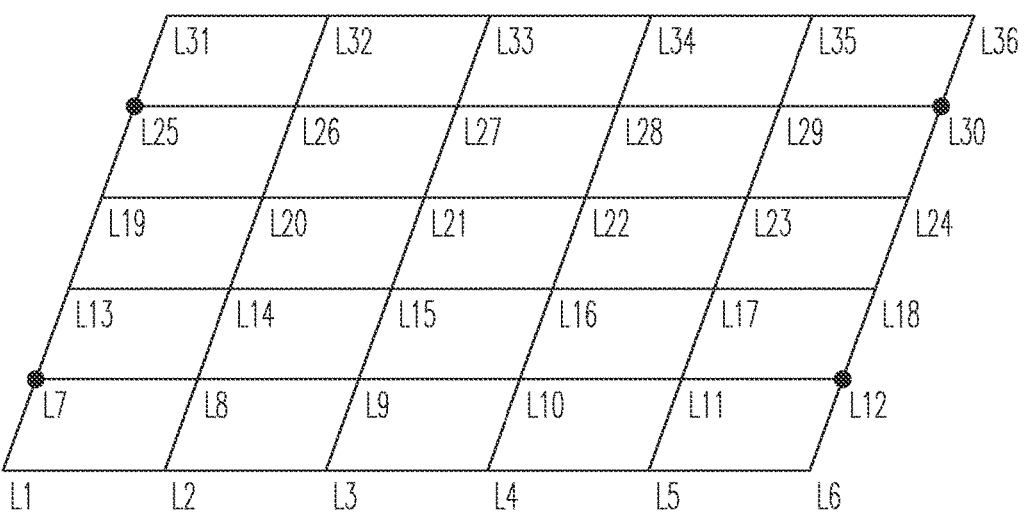
Figure 13A:
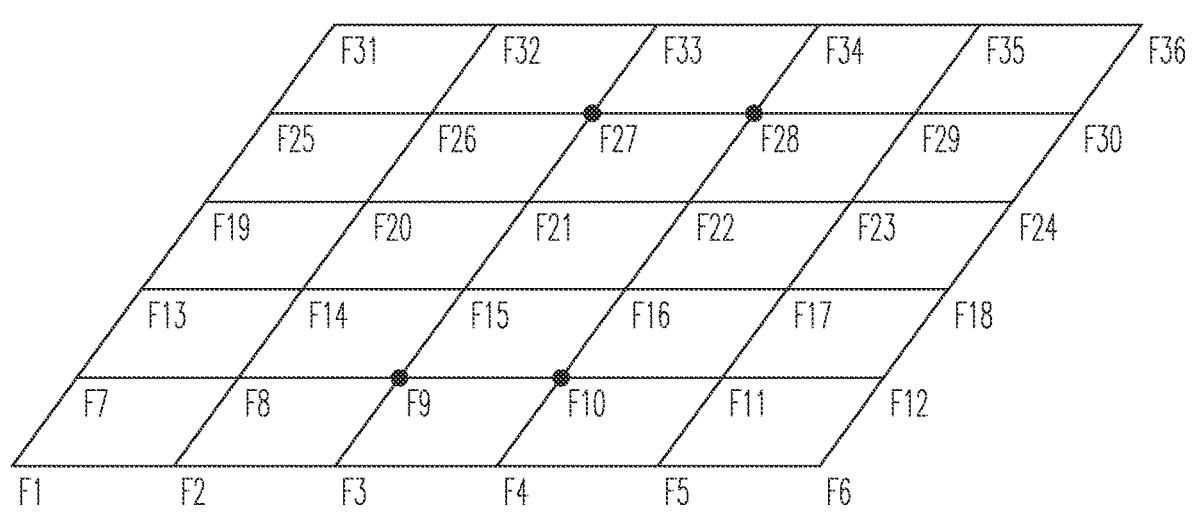

After the partitioning, every tile of the locations grid is associated with a tile of the facilities grid. Although the association can be arbitrary, in an embodiment, tiles with a large volume are associated with tiles with a small volume. Since the tiles have already been ordered depending on their volume, the association $\tau$ between tiles is the following: $\tau(TL_i)=TF_j$, where $j=(c/2^k)-i$. FIG. 13 shows in the example above how tiles are associated, following the cited strategy. FIGS. 11, 12, 13 and 13A further illustrate this example. Specifically, FIGS. 11 and 12 illustrate that location tile LT1 contains locations L1, L6, L31 and L36, and that location tile LT1 is associated with facility tile FT9, which contains facilities F15, F16, F21 and F22. FIGS. 13 and 13A illustrate that location tile LT2 contains locations L7, L12, L25 and L30, and that location tile L2 is associated with facility tile FT8, which contains facilities F9, F10, F27 and F28.

Thereafter, every location tile point (location) contained in a location tile is deterministically associated with a facility tile point contained in the associated facility tile. The association is defined such that if two locations of the same tile are "close," the correspondent facilities are "distant." Specifically, let FX and FY be two facilities of the same tile $FT_i$, a bijection $\pi\colon P\to L$ is defined such that if $|(FX, FY)|$ is "small" then $|(\pi(FX), \pi(FY))|$ is "big", where both locations $\pi(FX)$, $\pi(FY)$ belong to the location tile $\tau^{-1}(FT_i)$. Function $\pi$, restricted to a tile $FT_i$, can be defined listing in increasing order all distances between pairs of facilities in $FT_i$ and listing in decreasing order all distances between pairs of locations in $\tau^{-1}(FT_i)$ and finding the best association. Function $\pi$ is the association between facilities to locations proposed as a heuristic solution for the QAP problem defined on lattices. It is noted that these concepts of distances are restricted to elements of tiles formed of finite, and in an embodiment only about four or so, locations and facilities. It is therefore possible to compute and list in order of magnitude all possible distances between pairs of facilities in tile T, and similarly, to compute and list in order of magnitude all possible distances between pairs of locations in the tile associated with tile T. In any particular application, one of skill in the art should use some interpretation because the exact function $\pi$ cannot be defined independently from the particular application.

In summary, given a set of facilities F, a set of locations P, a flow function f and a distance function d (that satisfy some constraints), the disclosed embodiments find an assignment that is competitive in cost to the one found by simulated annealing but is orders of magnitude faster. In experiments, the additional cost penalty in the disclosed embodiments is less than 4%. The acceleration in computation emerges because the facilities/locations are first partitioned into tiles, then every facility tile is associated to a location tile, and finally every facility in every facility tile is associated to a location in the associated location tile.

Figure 14:
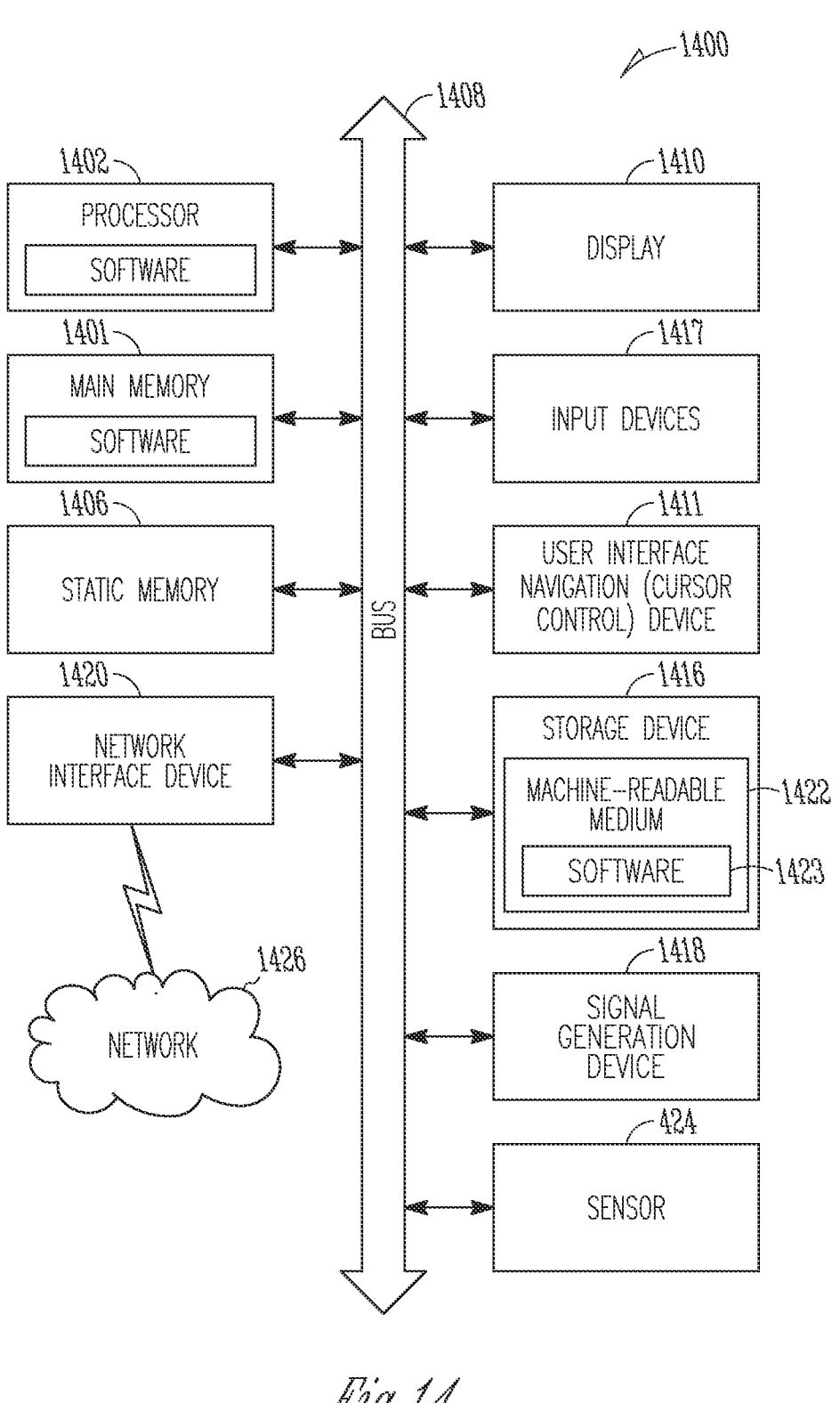
FIG. 14 is a block diagram of a computer system upon which one or more embodiments of the present disclosure can execute.

FIG. 14 is a block diagram illustrating a computing and communications platform 1400 in the example form of a general-purpose machine on which some or all the operations of the present disclosure may be carried out according to various embodiments. In certain embodiments, programming of the computing platform 1400 according to one or more particular algorithms produces a special-purpose machine upon execution of that programming. In a networked deployment, the computing platform 1400 may operate in the capacity of either a server or a client machine in server-client network environments, or it may act as a peer machine in peer-to-peer (or distributed) network environments.

Example computing platform 1400 includes at least one processor 1402 (e.g., a central processing unit (CPU), a graphics processing unit (GPU) or both, processor cores, compute nodes, etc.), a main memory 1401 and a static memory 1406, which communicate with each other via a link 1408 (e.g., bus). The computing platform 1400 may further include a video display unit 1410, input devices 1417 (e.g., a keyboard, camera, microphone), and a user interface (UI) navigation device 1411 (e.g., mouse, touchscreen). The computing platform 1400 may additionally include a storage device 1416 (e.g., a drive unit), a signal generation device 1418 (e.g., a speaker), and a network interface device 1420 for coupling to network 1426. A signal generation device 1418 and a sensor 1424 may also be present.

The storage device 1416 includes a non-transitory machine-readable medium 1422 on which is stored one or more sets of data structures and instructions 1423 (e.g., software) embodying or utilized by any one or more of the methodologies or functions described herein. The instructions 1423 may also reside, completely or at least partially, within the main memory 1401, static memory 1406, and/or within the processor 1402 during execution thereof by the computing platform 1400, with the main memory 1401, static memory 1406, and the processor 1402 also constituting machine-readable media.

While the machine-readable medium 1422 is illustrated in an example embodiment to be a single medium, the term "machine-readable medium" may include a single medium or multiple media (e.g., a centralized or distributed database, and/or associated caches and servers) that store the one or more instructions 1423. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks; and field programmable gate arrays (FPGA).

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

EXAMPLES

In Example No. 1, a process for optimizing a quadratic assignment problem (QAP) on a lattice comprising receiving into a computer processor facility data, the facility data comprising a given set of facilities; storing the facility data in the computer processor as a first set of a plurality of facilities in a facility grid, wherein the facility grid is partitioned into a plurality of facility tiles, the plurality of facility tiles comprising the facilities; receiving into the computer processor location data, the location data comprising a given set of locations; storing the location data in the computer processor as a second set of a plurality of locations in a location grid (having the same dimension k as the facility grid), wherein the location grid is partitioned into a plurality of location tiles, the plurality of location tiles comprising the locations; associating each facility tile to a location tile; associating each facility in each facility tile to a location in an associated location tile; identifying a flow function as distances between the plurality of facilities in the facility grid; identifying a distance function as distances between the plurality of locations in the location grid; and identifying a mapping or association function relating the facilities to the locations such that a low cost function between the flow function and the distance function is satisfied; wherein the flow function and the distance functions satisfy one or more constraints; wherein the facility dimension is equal to the location dimension, wherein a number of the facilities is equal to a number of the locations, and wherein a number of the facility tiles is equal to a number of the location tiles. Example No. 1 generates the (flow and location) tiles using a heuristic approach that enables the selection and mapping of points in the two grids. In related experiments, the additional cost penalty in Example No. 1 was less than 4% worse than the one found using the standard simulated annealing approach, but orders of magnitude faster. Example No. 1 generates the tiles in a manner that exploits the knowledge of a "good" basis.

Example No. 2 includes all the features of Example No. 1, and further includes a process wherein the flow function comprises a distance function between facilities in the facility grid. The flow function is a function f: P×P→R (P is the set of facilities, R is the set of real numbers) that can be interpreted as a Euclidian distance function between points in a finite grid. The x in "P×P" simply means the domain (input of the function) is the set of all possible pairs of facilities, i.e., the input of the function is 2 facilities.

Example No. 3 includes all the features of Example Nos. 1-2, and further includes a process wherein the distance function comprises a distance between locations in the locations grid. In other words, the distance function is the usual Euclidian distance function d: L×L→R (L is the set of locations).

Example No. 4 includes all the features of Example Nos. 1-3, and further includes a process wherein the cost function comprises:

$$\sum_{a,b\in P} f(a, b) \times d(\pi(a), \pi(b))$$

wherein P comprises the set of all facilities; therefore a and b are facilities

8 wherein f comprises the flow function f: P×P→R;
wherein π: P→L comprises the association function, therefore π(a) denotes the location associated with the facility a and π(b) denotes the location associated with the facility b
wherein d denotes the distance function d: L×L→R.

Example No. 5 includes all the features of Example Nos. 1-4, and further includes a process wherein a cardinality of facility tiles and a cardinality of location tiles comprise 2 raised to a power of the grids dimension ($2^k$ is the cardinality of the vertices of a cube in k dimensions).

Example No. 6 includes all the features of Example Nos. 1-5, and further includes a process including applying the minimized cost function to placing and routing connections on a circuit board, setting up a factory layout, and other commercial and industrial applications.

Example No. 7 includes all the features of Example Nos. 1-6, and further includes a process wherein the facility tiles and location tiles are generated using a heuristic approach, thereby enabling a selection and mapping of locations in the locations grid and facilities in the facility grid that minimizes cost.

Example No. 8 includes all the features of Example Nos. 1-7, and further includes a process wherein the associating each facility in each facility tile to a location in the associated location tile such that when two particular locations are close, the corresponding facilities are distant.

Example No. 9 is a machine-readable medium comprising instructions that when executed by a processor execute a process comprising receiving into a computer processor facility data, the facility data comprising a given set of facilities on a finite lattice; storing the facility data in the computer processor as a first set of a plurality of facilities in a facility grid, wherein the facility grid is partitioned into a plurality of facility tiles, the plurality of facility tiles comprising the facilities; receiving into the computer processor location data, the location data comprising a given set of locations; storing the location data in the computer processor as a second set of a plurality of locations in a location grid, wherein the location grid is partitioned into a plurality of location tiles, the plurality of location tiles comprising the locations; associating each facility tile to a location tile; associating each facility in each facility tile to a location in an associated location tile; identifying a flow function as distances between the plurality of facilities in the facility grid; identifying a distance function as distances between the plurality of locations in the location grid; and identifying an association function relating the facilities to the locations such that a local minimum for a cost function depending on the flow function and the distance function is found; wherein the flow function and the distance function satisfy one or more constraints; and wherein dimensions of the facility grid are equal to dimensions of the location grid, wherein a number of the facilities is equal to a number of the locations, and wherein a number of the facility tiles is equal to a number of the location tiles.

Example No. 10 includes all the features of Example No. 9, and optionally includes a machine-readable medium wherein the flow function comprises an arbitrary norm between facilities in the facility grid.

Example No. 11 includes all the features of Example Nos. 9-10, and optionally includes a machine-readable medium wherein the distance function comprises an arbitrary norm between points in the locations grid.

Example No. 12 includes all the features of Example Nos. 9-11, and optionally includes a machine-readable medium wherein the cost function comprises:

$$\sum_{a,b\in P} f(a,b)\times d(\pi(a),\pi(b))$$

wherein P comprises a set of all the facilities such that a
and b are the facilities;

wherein f comprises the flow function f: P×P→R;

wherein π: P→L comprises the association function such
that π(a) comprises a first location associated with a
first facility and π(b) comprises a second location
associated with a second facility; and wherein d comprises the distance function d: L×L→R.

Example No. 13 includes all the features of Example Nos.
9-12, and optionally includes a machine-readable medium
wherein a cardinality of facility tiles and a cardinality of
location tiles comprise a value of 2 raised to a power of the
location dimension.

Example No. 14 includes all the features of Example Nos.
9-13, and optionally includes a machine-readable medium
comprising instructions for applying the minimized cost
function to placing and routing connections on a circuit
board; wherein the locations comprise sites in a backboard,
the facilities comprise elements to a position in the back-
board, the distance function comprises the Euclidian dis-
tance between the sites in the backboard and the flow
function comprises a number of wires every two backboard
elements share.

Example No. 15 includes all the features of Example Nos.
9-14, and optionally includes a machine-readable medium
wherein the facility tiles and the location tiles are generated
using a heuristic approach, thereby enabling a selection and
mapping of locations in the locations grid and facilities in
the facility grid that result in a minimum cost.

Example No. 16 includes all the features of Example Nos.
9-15, and optionally includes a machine-readable medium
wherein the associating each facility in each facility tile to
a location in the associated location tile is executed such that
when two particular locations are close the corresponding
facilities are distant.

Example No. 17 is a system comprising a computer
processor; and a memory coupled to the computer processor;
wherein the computer processor and the memory are oper-
able for receiving into a computer processor facility data, the
facility data comprising a given set of facilities on a finite
lattice; storing the facility data in the computer processor as
a first set of a plurality of facilities in a facility grid, wherein
the facility grid is partitioned into a plurality of facility tiles,
the plurality of facility tiles comprising the facilities; receiv-
ing into the computer processor location data, the location
data comprising a given set of locations; storing the location
data in the computer processor as a second set of a plurality
of locations in a location grid, wherein the location grid is
partitioned into a plurality of location tiles, the plurality of
location tiles comprising the locations; associating each
facility tile to a location tile; associating each facility in each
facility tile to a location in an associated location tile;
identifying a flow function as distances between the plurality
of facilities in the facility grid; identifying a distance func-
tion as distances between the plurality of locations in the
location grid; and identifying an association function relat-
ing the facilities to the locations such that a local minimum
for a cost function depending on the flow function and the
distance function is found; wherein the flow function and the
distance function satisfy one or more constraints; and
wherein dimensions of the facility grid are equal to dimen-
sions of the location grid, wherein a number of the facilities is equal to a number of the locations, and wherein a number
of the facility tiles is equal to a number of the location tiles.

Example No. 18 includes all the features of Example No.
17, and optionally includes a system wherein the flow
function comprises an arbitrary norm between facilities in
the facility grid; wherein the distance function comprises an
arbitrary norm between points in the locations grid; wherein
the facility tiles and the location tiles are generated using a
heuristic approach, thereby enabling a selection and map-
ping of locations in the locations grid and facilities in the
facility grid that result in a minimum cost; and wherein the
associating each facility in each facility tile to a location in
the associated location tile is executed such that when two
particular locations are close the corresponding facilities are
distant.

Example No. 19 includes all the features of Example Nos.
17-18, and optionally includes a system wherein the cost
function comprises:

$$\sum_{a,b\in P} f(a,b)\times d(\pi(a),\pi(b))$$

wherein P comprises a set of all the facilities such that a
and b are the facilities;

wherein f comprises the flow function f: P×P→R;

wherein π: P→L comprises the association function such
that π(a) comprises a first location associated with a
first facility and π(b) comprises a second location
associated with a second facility; and wherein d comprises the distance function d: L×L→R.

Example No. 20 includes all the features of Example Nos.
17-19, and optionally includes a system wherein the com-
puter processor and memory are operable for applying the
minimized cost function to placing and routing connections
on a circuit board; wherein the locations comprise sites in a
backboard, the facilities comprise elements to a position in
the backboard, the distance function comprises the Euclidian
distance between the sites in the backboard and the flow
function comprises a number of wires every two backboard
elements share.

The invention claimed is:

1. A process for optimizing instances of a quadratic
assignment problem (QAP) on a given lattice comprising:

receiving into a computer processor facility data, the
facility data comprising a given set of facilities on a
finite lattice;

storing the facility data in the computer processor as a first
set of a plurality of facilities in a facility grid, wherein
the facility grid is partitioned into a plurality of facility
tiles, the plurality of facility tiles comprising the facili-
ties;

receiving into the computer processor location data, the
location data comprising a given set of locations;

storing the location data in the computer processor as a
second set of a plurality of locations in a location
grid, wherein the location grid is partitioned into a
plurality of location tiles, the plurality of location
tiles comprising the locations;

associating each facility tile to a location tile;

associating each facility in each facility tile to a loca-
tion in an associated location tile;

identifying a flow function as distances between the
plurality of facilities in the facility grid;

identifying a distance function as distances between the
plurality of locations in the location grid; and identifying an association function relating the facilities to the locations such that a local minimum for a cost function depending on the flow function and the distance function is found;

wherein the flow function and the distance function satisfy one or more constraints;

wherein dimensions of the facility grid are equal to dimensions of the location grid, wherein a number of the facilities is equal to a number of the locations, and wherein a number of the facility tiles is equal to a number of the location tiles;

wherein the cost function comprises:

$$\sum_{a,b \in P}^{\square} f(a, b) \times d(\pi(a), \pi(b))$$

wherein P comprises a set of all the facilities such that a and b are the facilities;

wherein f comprises the flow function f: $P \times P \rightarrow R$;

wherein $\pi$: $P \rightarrow L$ comprises the association function such that (a) comprises a first location associated with a first facility and $\pi(b)$ comprises a second location associated with a second facility:

wherein d comprises the distance function d: $L \times L \rightarrow R$;

wherein R comprises the set of real numbers;

wherein L comprises the set of all locations; and wherein the facility tiles and the location tiles are generated using a heuristic approach, thereby enabling a selection and mapping of locations in the locations grid and facilities in the facility grid that result in a minimum computational cost.

2. The process of claim 1, wherein the flow function comprises an arbitrary norm between facilities in the facility grid.

3. The process of claim 1, wherein the distance function comprises an arbitrary norm between points in the locations grid.

4. The process of claim 1, wherein a cardinality of each facility tile and a cardinality of each location tile is $2^k$, where k is the dimension of the facility grid and the location grid.

5. The process of claim 1, comprising applying the minimized cost function to placing and routing connections on a circuit board; wherein the locations comprise sites in a backboard, the facilities comprise elements to a position in the backboard, the distance function comprises the Euclidian distance between the sites in the backboard and the flow function comprises a number of wires every two backboard elements share.

6. The process of claim 1, wherein the associating each facility in each facility tile to a location in the associated location tile is executed such that when two particular locations are close the corresponding facilities are distant.

7. A non-transitory machine-readable medium comprising instructions that when executed by a processor execute a process comprising:

receiving into a computer processor facility data, the facility data comprising a given set of facilities on a finite lattice;

storing the facility data in the computer processor as a first set of a plurality of facilities in a facility grid, wherein the facility grid is partitioned into a plurality of facility tiles, the plurality of facility tiles comprising the facilities;

receiving into the computer processor location data, the location data comprising a given set of locations;

storing the location data in the computer processor as a second set of a plurality of locations in a location grid, wherein the location grid is partitioned into a plurality of location tiles, the plurality of location tiles comprising the locations;

associating each facility tile to a location tile;

associating each facility in each facility tile to a location in an associated location tile;

identifying a flow function as distances between the plurality of facilities in the facility grid;

identifying a distance function as distances between the plurality of locations in the location grid; and identifying an association function relating the facilities to the locations such that a local minimum for a cost function depending on the flow function and the distance function is found;

wherein the flow function and the distance function satisfy one or more constraints; and wherein dimensions of the facility grid are equal to dimensions of the location grid, wherein a number of the facilities is equal to a number of the locations, and wherein a number of the facility tiles is equal to a number of the location tiles;

wherein the cost function comprises:

$$\sum_{a,b \in P}^{\square} f(a, b) \times d(\pi(a), \pi(b))$$

wherein P comprises a set of all the facilities such that a and b are the facilities;

wherein f comprises the flow function f: $P \times P \rightarrow R$;

wherein $\pi$: $P \rightarrow L$ comprises the association function such that $\pi(a)$ comprises a first location associated with a first facility and $\pi(b)$ comprises a second location associated with a second facility;

wherein d comprises the distance function d: $L \times L \rightarrow R$;

wherein R comprises the set of real numbers;

wherein L comprises the set of all locations; and wherein the facility tiles and the location tiles are generated using a heuristic approach, thereby enabling a selection and mapping of locations in the locations grid and facilities in the facility grid that result in a minimum computational cost.

8. The non-transitory machine-readable medium of claim 7, wherein the flow function comprises an arbitrary norm between facilities in the facility grid.

9. The non-transitory machine-readable medium of claim 7, wherein the distance function comprises an arbitrary norm between points in the locations grid.

10. The non-transitory machine-readable medium of claim 7, wherein a cardinality of each facility tile and a cardinality of each location tile is $2^k$, where k is the dimension of the facility grid and the location grid.

11. The non-transitory machine-readable medium of claim 7, comprising applying the minimized cost function to placing and routing connections on a circuit board; wherein the locations comprise sites in a backboard, the facilities comprise elements to a position in the backboard, the distance function comprises the Euclidian distance between the sites in the backboard and the flow function comprises a number of wires every two backboard elements share.

12. The non-transitory machine-readable medium of claim 7, wherein the associating each facility in each facility tile to a location in the associated location tile is executed such that when two particular locations are close the corresponding facilities are distant.

13. A system comprising:

a computer processor; and a memory coupled to the computer processor;

wherein the computer processor and the memory are operable for:

receiving into a computer processor facility data, the facility data comprising a given set of facilities on a finite lattice;

storing the facility data in the computer processor as a first set of a plurality of facilities in a facility grid, wherein the facility grid is partitioned into a plurality of facility tiles, the plurality of facility tiles comprising the facilities;

receiving into the computer processor location data, the location data comprising a given set of locations;

storing the location data in the computer processor as a second set of a plurality of locations in a location grid, wherein the location grid is partitioned into a plurality of location tiles, the plurality of location tiles comprising the locations;

associating each facility tile to a location tile;

associating each facility in each facility tile to a location in an associated location tile;

identifying a flow function as distances between the plurality of facilities in the facility grid;

identifying a distance function as distances between the plurality of locations in the location grid; and identifying an association function relating the facilities to the locations such that a local minimum for a cost function depending on the flow function and the distance function is found;

wherein the flow function and the distance function satisfy one or more constraints;

wherein dimensions of the facility grid are equal to dimensions of the location grid, wherein a number of the facilities is equal to a number of the locations, and wherein a number of the facility tiles is equal to a number of the location tiles;

wherein the cost function comprises:

14

$$\sum_{a,b\in P}^{\square} f(a, b) \times d(\pi(a), \pi(b))$$

wherein P comprises a set of all the facilities such that a and b are the facilities;

wherein f comprises the flow function f: P×P→R;

wherein π: P→L comprises the association function such that π(a) comprises a first location associated with a first facility and π(b) comprises a second location associated with a second facility;

wherein d comprises the distance function d: L×L→R;

wherein R comprises the set of real numbers;

wherein L comprises the set of all locations; and wherein the facility tiles and the location tiles are generated using a heuristic approach, thereby enabling a selection and mapping of locations in the locations grid and facilities in the facility grid that result in a minimum computational cost.

14. The system of claim 13, wherein the flow function comprises an arbitrary norm between facilities in the facility grid; wherein the distance function comprises an arbitrary norm between points in the locations grid; wherein the facility tiles and the location tiles are generated using a heuristic approach, thereby enabling a selection and mapping of locations in the locations grid and facilities in the facility grid that result in a minimum cost; and wherein the associating each facility in each facility tile to a location in the associated location tile is executed such that when two particular locations are close the corresponding facilities are distant.

15. The system of claim 13, wherein the computer processor and memory are operable for applying the minimized cost function to placing and routing connections on a circuit board; wherein the locations comprise sites in a backboard, the facilities comprise elements to a position in the backboard, the distance function comprises the Euclidian distance between the sites in the backboard and the flow function comprises a number of wires every two backboard elements share.

\* \* \* \* \*